United States Patent
Feil et al.

(10) Patent No.: US 10,948,709 B2
(45) Date of Patent: Mar. 16, 2021

(54) ELECTROWETTING OPTICAL ELEMENT

(71) Applicant: MIORTECH B.V., Eindhoven (NL)

(72) Inventors: Hermanus Feil, Eindhoven (NL); Doeke Jolt Oostra, Eindhoven (NL)

(73) Assignee: MIORTECH B.V., Eindhoven (NL)

( * ) Notice: Subject to any disclaimer, the term of this patent is extended or adjusted under 35 U.S.C. 154(b) by 121 days.

(21) Appl. No.: 15/771,380

(22) PCT Filed: Oct. 28, 2016

(86) PCT No.: PCT/EP2016/076161
§ 371 (c)(1),
(2) Date: Apr. 26, 2018

(87) PCT Pub. No.: WO2017/072336
PCT Pub. Date: May 4, 2017

(65) Prior Publication Data
US 2018/0335619 A1 Nov. 22, 2018

(30) Foreign Application Priority Data
Oct. 29, 2015 (NL) .................................... 2015679

(51) Int. Cl.
*G02B 26/00* (2006.01)
(52) U.S. Cl.
CPC ................ *G02B 26/005* (2013.01)
(58) Field of Classification Search
None
See application file for complete search history.

(56) References Cited

U.S. PATENT DOCUMENTS

| | | | |
|---|---|---|---|
| 2002/0154408 A1 | 10/2002 | Minoura et al. | |
| 2003/0053015 A1 | 3/2003 | Minoura et al. | |
| 2007/0001927 A1 | 1/2007 | Ricks et al. | |
| 2009/0232509 A1* | 9/2009 | Heikenfeld | G02B 5/124 398/118 |
| 2013/0278994 A1 | 10/2013 | Feil | |

FOREIGN PATENT DOCUMENTS

| KR | 20140071796 A | 6/2014 |
|---|---|---|
| WO | 2014/163504 A1 | 10/2014 |

OTHER PUBLICATIONS

Shultz, P., et al., "Investigation of five types of switchable retroreflector films for enhanced visible and infrared conspicuity applications." *Applied Optics* 51(17), 3744-3754, (Jun. 2012). 11 pages.

(Continued)

*Primary Examiner* — Robert E. Tallman
(74) *Attorney, Agent, or Firm* — Steinfl + Bruno LLP

(57) ABSTRACT

An electrowetting optical element, having a first electrode layer stack and a second electrode layer stack. Each layer stack has an electrode for applying a voltage to the electrodes for rearranging polar liquid relative to non-polar liquid. A containment space is formed between the first and second electrode layer stack. One or more cell walls extend between the electrode stacks for defining sides of the containment space forming cells. The electrowetting optical element further includes a retroreflective layer for reflecting incident light back through the element.

16 Claims, 2 Drawing Sheets

(56) References Cited

OTHER PUBLICATIONS

Kilaru, M.K., et al., "Advanced characterization of eletrowetting retroreflectors." *Optics Express* 17(20), 17563-17569, (Sep. 2009). 7 pages.
International Search Report for PCT/EP2016/076161 filed on Oct. 28, 2016 on behalf of MIORTECH B.V. dated Dec. 15, 2016. 5 pages.
Written Opinion for PCT/EP2016/076161 filed on Oct. 28, 2016 on behalf of MIORTECH B.V. dated Dec. 15, 2016. 10 pages.

\* cited by examiner

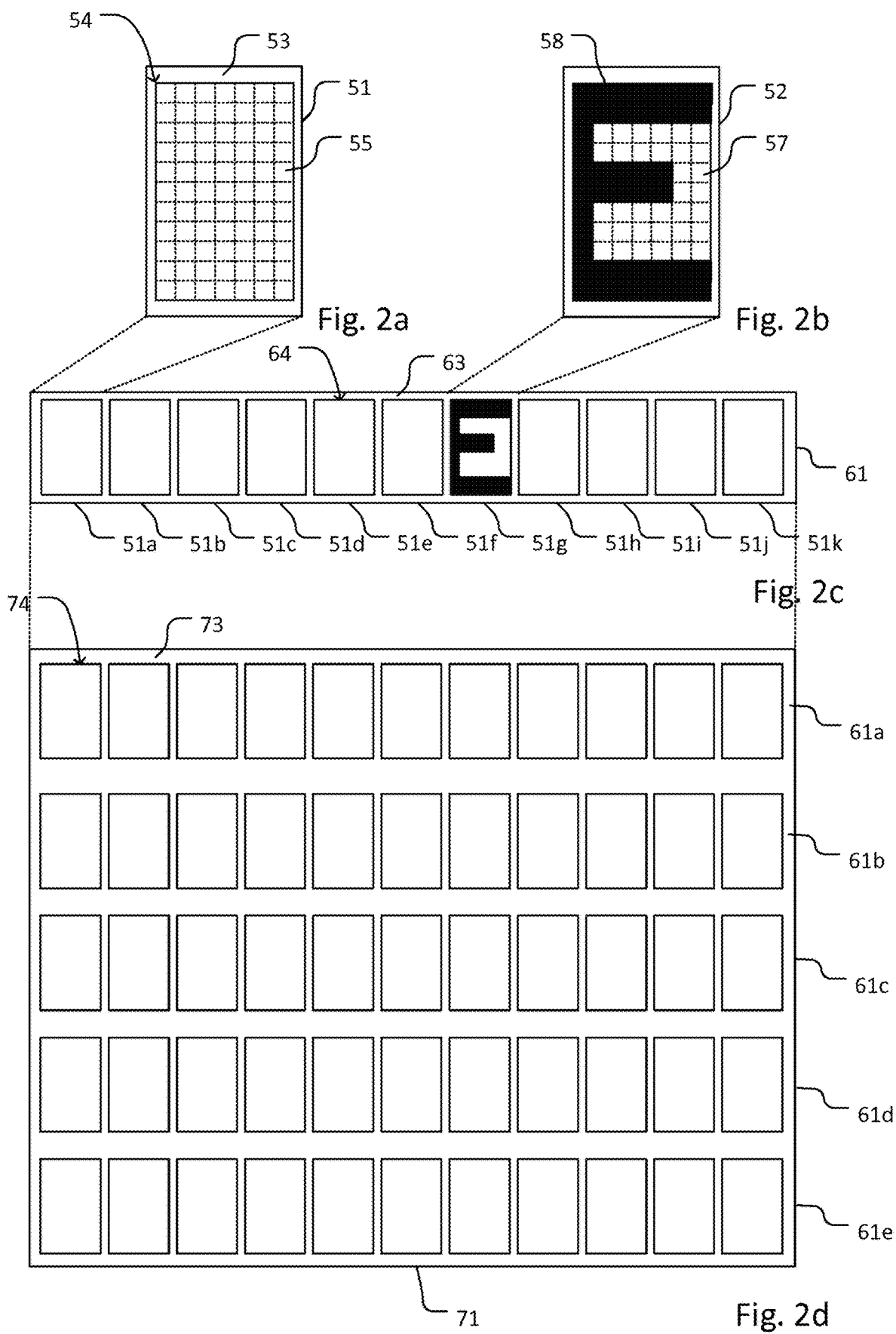

ELECTROWETTING OPTICAL ELEMENT

CROSS-REFERENCE TO RELATED APPLICATIONS

The present application is the U.S. National Stage of International Patent Application No. PCT/EP2016/076161 filed on Oct. 28, 2016 which, in turn, claims priority to Netherlands Patent Application No. 2015679 filed on Oct. 29, 2015.

FIELD OF THE INVENTION

The present invention relates to an electrowetting optical element, a display comprising at least one electrowetting optical element, and a method of manufacturing an electrowetting optical element.

BACKGROUND

Electrowetting technology is based on modification of an energy balance between on one hand surface tension forces of liquids and wetting properties of a solid surface, and on the other hand electrostatic forces induced by an applied voltage over a capacitor arrangement comprising said boundary layer.

An electrowetting optical element, further referred to as electrowetting element, according to the state of the art may from bottom to top be comprised of respectively an electrode layer stack comprising a substrate and an electrode layer, an electrically insulating hydrophobic layer or an insulating layer having a hydrophobic surface on a side opposite to the other electrode layer, for interfacing to a polar liquid and a non-polar liquid immiscible with each other. From a viewing path, this stack, at the bottom of the element can be denoted as the second stack, comprising the second electrode layer.

The element may further comprise another electrode layer stack, which is opposite to the above described electrode stack and comprising an electrode layer which is electrically in contact with the polar liquid and a superstrate for supporting the electrode layer. This electrode layer may have a hydrophobicity that is lower than the hydrophobic interface surface of the second electrode layer stack. This stack, at the top of the element, can be denoted as the first stack, comprising the first electrode layer.

Cell walls attached to the electrode layer stack and extending from one electrode layer stack towards the other electrode layer stack, form a containment space between both electrode stacks and the cell walls. The cell walls thus form a barrier for the polar liquid between the electrowetting cell and adjacent electrowetting cells to keep the non-polar liquid from moving towards other cells.

An electrowetting element can thus form a picture element or pixel. A plurality of electrically controlled electrowetting elements can together form a display or part thereof comprising pixels, which can be used for displaying arbitrary images by appropriately controlling the electrowetting elements forming the display. Electrowetting elements can have arbitrary shapes determined by the shape of the electrodes, such that displays can be manufactured for specific purposes.

An electrowetting element is mainly transparent, except for the non-polar liquid in each of the cells formed by the cell walls. The non-polar liquid is often non-transparent or has a low optical transmission coefficient. The transmission coefficient of the non-polar liquid typically depends on the application of the electrowetting element. In a colour display, an electrowetting element comprising coloured non-polar liquids may be used.

The principles of operation of an electrowetting element are as follows. In an unpowered state, i.e. when no voltage is applied over the first and second electrode, the lowest energetic state of the system is where the non-polar liquid forms a boundary layer between the polar liquid and the hydrophobic surface of the insulating layer. This is because the polar liquid is repelled by the hydrophobic layer. The poor transmissibility of the non-polar liquid then forms an obstruction to light that penetrates the system.

When a voltage is applied over the electrodes, the lowest energetic state of the system becomes the situation wherein the (poorly conductive or insulating) non-polar liquid is pushed aside by the (conductive) polar liquid, and the polar liquid thereby being in direct contact with the insulating hydrophobic layer. Note that the voltage must be large enough for the electrostatic forces to overcome the repellent and surface tension forces that separate the polar liquid from the hydrophobic surface. In this situation, light that penetrates the system has rather unobstructed access to the insulating hydrophobic layer because of the well transmissibility of the polar liquid and the non-polar liquid being pushed aside. In the powered up state, when voltage is applied over the electrodes, the electrowetting element is thus transmissive. This working principle is used in electrowetting type displays and screens.

Digital billboards are known using Light Emitting Diodes, LEDs, which emit intense light, in order to compensate en overcome the daylight. This results in light pollution, in particular when the environmental light level drops, during the evening/night. Moreover, LED displays may emit at such levels, that it can be considered unsafe for road users as it causes distraction. Moreover, LED displays, in these dimensions needed for digital billboards consume high amounts of energy. Accordingly, there is a need for improved displays which are suitable for large dimension applications such as digital billboards.

SUMMARY OF THE INVENTION

It is an object of the present invention to provide an improved display suitable for large dimension applications such as digital billboards and road signs. More in particular, it is a further object of the present invention to provide an electrowetting optical element suitable for large dimension applications that can be used at low light levels and which obviate at least some of the above mentioned problems and disadvantages of the prior art.

In accordance with a first aspect of the invention the above mentioned object is achieved by an electrowetting optical element, comprising a first electrode layer stack, a second electrode layer stack, each of the first and second electrode layer stack comprising an electrode for applying a voltage to the electrodes for rearranging the polar liquid relative to the non-polar liquid, a containment space formed between the first and second electrode layer stack, and one or more cell walls extending between the first and second electrode stacks for defining sides of the containment space forming cells, the containment space at least containing a polar liquid and a non-polar liquid, the polar and non-polar liquids being immiscible with each other, characterised in that the electrowetting optical element further comprises a retroreflective layer for reflecting incident light back through the element.

The electrowetting optical element is thus comprised of two layer stacks, the first electrode layer stack and the second electrode layer stack. The first stack forms the top surface of the element, i.e. the side used in the display for viewing. The second stack forms the bottom surface of the element, i.e. the side used as back side, for example where a reflective coating is used.

An application in which electrowetting optical elements are particular useful is digital billboards. Digital billboards or electronic billboards are large displays, often used near roads, parking lots, etc. and used to deliver advertising campaigns and informational messages to the people who are passing by the displays. Digital billboards have the advantage that these are dynamic, flexible and draw more attention than conventional billboards.

Since the billboards are often of very large size, the dimensions are such that they have to be comprised of several individual displays. It is known in the art to use LED displays to form such a large size digital billboard. Although LEDs are known for having low energy requirements, the setup of these displays in often high environmental light situations require LEDs which emit intense light, higher than for example in standard displays which are mostly used inside buildings. Only with these high intensity LEDs the daylight can be compensated. This requirement, in combination with the large dimensions of the billboard, makes billboards even with energy efficient LED technology still high power consuming applications. The amount of power required can even equal the amount of 30 standard households.

Electrowetting optical elements are particularly suitable for such billboard applications since the above mentioned drawbacks are not present in electrowetting optical elements. Electrowetting optical elements do not use LED technology but use the known electrowetting technology by which the surface tension of liquids on a solid surface that is usually hydrophobic, using a voltage. With applying the voltage, the wetting properties of a hydrophobic surface can be modified and the surface becomes increasingly hydrophilic. This way two immiscible liquids, i.e. a polar liquid such as a water based liquid, and a non-polar liquid, such as an oily liquid, can rearrange. The amount of power needed to drive the element is very low, in particular when compared to active displays such as LEDs. This makes them highly suitable as digital billboard.

When activated, i.e. when a voltage is applied to the electrodes, the non-polar liquid, e.g. the oil within the cell of the element is displaced and the light that penetrates the system has rather unobstructed access and either move unobstructed through the element, or is reflected by the second stack. By activating electrodes of the matrix corresponding to particular pixels, the display can show static or dynamic content such as text, an image or a video.

In order to increase visibility only highly reflective surfaces can be used, contrary to the billboards having LED technology wherein the light intensity of the LEDs is increased, or high power LEDs are used. Just increasing intensity of the LEDs of conventional billboards will however result in other problems. For example, the fact that during daytime the intensity of the LEDs has to be high, and during night-time the intensity has to be low. The invention is based on the inside that reflection of the electrowetting optical elements can be increased by use of a retroreflective layer, sheet, film or tape.

Retroreflecting layers are known for the low amount of scattering. In such a retroreflector reflects incident light (electromagnetic radiation) back along a path that is parallel to and in opposite direction of the light source. Standard reflective surfaces only have good reflection of incoming light when the incoming light is perpendicular to the reflecting surface. Thus only at very specific positions in respect of the display, the amount of light returned from the display is high. Since billboards are often placed near roads and highways, the viewers are almost never in such a perfect position or orientation and neither is the billboard. With the use of a retroreflecting layer this problem is obviated. Since from almost any position the light is reflected back towards the viewer, in particular during night when headlights of cars shine there light towards the billboard.

In an example is the retroreflective layer attached to the first or second electrode layer stack. In another example is the retroreflective layer comprised in the first or second electrode layer stack.

The retroreflector can be comprised in either the first or second electrode layer stack, depending on the application and use of the electrowetting optical element, i.e. whether the side of the first or the second stack is the viewing side in which the light penetrates the element. Preferably the electrowetting optical element is used in a conventional manner wherein the side of the first stack is the viewing side and the retroreflector is comprised in the second stack.

In an example comprises the first electrode layer stack a superstrate and a first electrode layer having a hydrophilic interface surface with the containment space, and wherein the second electrode layer stack comprising a substrate, a second electrode layer and an insulating layer having a hydrophobic interface surface with the containment space, wherein the hydrophobic interface surface of the second electrode stack has a higher hydrophobicity than the hydrophilic interface surface of the first stack.

Conventional electrowetting optical elements are build up of at least a first electrode layer stack having a transparent superstrate and first electrode with a hydrophilic interface surface with the containment space in which the polar and non-polar liquid are comprised. Furthermore, the second electrode layer stack comprises a substrate, a second electrode layer and an insulating layer having a hydrophobic interface surface with the containment space as well. The hydrophobic interface surface of the second electrode stack has a higher hydrophobicity than the hydrophobic interface surface of the first stack. The retroreflective layer can be comprised within the first electrode stack layer or preferably in the second electrode stack layer. More in particular, between the substrate and the second electrode layer or between the second electrode layer and the insulating layer. More layers can be present in the first as well as in the second stack. For example, a barrier layer can be provided in the second stack between the insulating layer and the hydrophobic interface surface for prevention of ion migration and charge accumulation in the insulating layer. The hydrophobic interface surfaces can be present as a separate layer, or preferably in the form of a coating.

In accordance with a second aspect of the invention an electrowetting display is provided comprising one or more electrowetting optical elements in accordance with any of the previous descriptions.

In a display several electrowetting optical elements are combined such that a visual presentation can be shown on the display. In particular for road signs or billboards the use of such displays with electrowetting optical elements are very beneficial amongst others due to the high contrast, high visibility and low power consumption. Most known displays, e.g. even modern LCD displays, are provided with active backlights. Such backlights are responsible for a large amount of the energy consumed by the display. In a electrowetting display with electrowetting elements according to the invention the elements are reflective and more in particular, retroreflective. Hence, such displays can be used without active backlight. This results in lower to zero light pollution, far less power consumption and better contrast in all conditions when compared with LED and LCD displays.

The display is preferably comprised of several elements or tiles. Each element is for example arranged to display one single character having several pixels, e.g. 7×11 pixels. Such that a display of for example 10×2 elements is thus capable of displaying two rows of ten characters made from 7×11 pixels. Other layouts are of course also possible.

The elements are surrounded by a housing, called the bezel. The bezel is the inactive part of the element whereas the active part is formed by the sum of the pixels. The inactive bezel is needed the keep the elements at place and to increase structural strength. A display panel or a visual presentation assembly can be constructed from one single display having several elements, e.g. 10×1 elements, or it could be constructed from several displays having several element, e.g. two rows displays having 10×1 elements. Both the inactive area around the elements/tiles (elements bezel) as well as the inactive area of the display/groups of tiles (display bezel) are static and they have a non dynamic colour which is for example white.

In an example the electrowetting display comprises an active display area comprised of one or more electrowetting optical elements in accordance with any of the previous claims, as well as a passive bezel for housing the active display area, wherein the passive bezel is manufactured from a material that allows reflection of light waves at least in the visible spectrum or allows transmission of light waves at least in the visible spectrum and comprises an additional layer behind the transmissive material which additional layer reflects the light back through the transmissive material, e.g. the additional layer being a retroreflective layer.

The white colour of the bezels or inactive areas of the display and hence the full panel or visual presentation assembly, correspond with the background colour of the pixels, and hence the elements/tiles. If the pixel is in a powered state, i.e. showing its neutral background colour, its colour is white. This colour thus corresponds with the colour of the bezels. If no information is shown on the display or on the full panel/visual presentation assembly, the full surface, including both the active areas and the inactive housing parts, is perceived by a viewer as one single surface in which no distinction can be made between the active and inactive areas. However, under certain light conditions such as at night, the light reflected back by the retroreflective layer will light up the active parts whereas the passive inactive areas will not. The result is thus that inactive areas stay black just like the unpowered pixels of the element. This will decrease readability and increase the ability to distinguish the bezels from the background of the elements. Accordingly, in such conditions the viewer observes a character in black colour, a remaining background of the active area of the element which due to the retroreflection is in a white colour and an inactive area of the bezels which is again in black colour. What is desired is that in such conditions the powered colour of the active area of the elements corresponds in colour with that of the inactive area of the bezels. An electrowetting display with a passive bezel which is manufactured from a material that allows transmission of light waves at least in the visible spectrum provides for such a solution since the material does not absorb the light and is thus not black but white in accordance with the background of the elements. As such a display is provided in which even under night conditions, the distinction between the background of the elements and the housing parts/bezels is reduced to a minimum.

In an example the material of the passive bezel is coloured in accordance with a background colour of the one or more electrowetting optical elements of the active display area.

To even further reduce the difference in colour between the background of the elements and the housing parts/bezels, the light transmissive passive bezel can be coloured to such a degree that it even more corresponds with the colour of the light reflected back through the elements background area.

In an example the colouring of the passive bezel is provided by adding a grey filter on top of the retroreflective layer.

An example of providing the colouring effect is by changing the material or by adding a colour filter such as a grey colour filter. The light reflected back through the elements is off-white and more in particular in the grey spectrum. By adding a grey filter to the light transmissive bezel parts and preferably using the same retroreflective layer behind the bezel as behind the elements, it becomes extremely difficult to distinct the background of the elements from the housing parts/bezels.

In an example the colouring of the passive bezel is provided by a retroreflective layer having a lower level of light reflection in the visible spectrum for reflecting grey light.

Alternatively, the matching colours of the background of the elements and the bezels can also be done by adapting the level of reflection, either for the elements/tiles, or preferably for the bezels. For example, the level of reflection by the retroreflective layer could be lower for the bezels than for the elements/tiles. By lowering the level of reflection or by lowering the level of transmission though the bezels, the light from the bezels is lower and observed as grey just like the background of the elements.

The elements and the bezel parts, i.e. the active and the passive area's of the display can be provided with the same retroreflective layer, for example a retroreflective tape.

In an example the passive bezel comprises a retroreflective layer for reflecting incident light back through the passive bezel, and wherein in particular the retroreflectivity of both the active display area and the passive bezel is provided by a single retroreflective layer, more in particular a (adhesive) retroreflective tape over the full back surface of the display. However, in an example, different retroreflective layers or more in particular (adhesive) retroreflective tapes could be used, for example for the embodiment wherein matching of the colours is to be provided by the retroreflective layer/tape.

In accordance with a third aspect of the invention a visual presentation assembly is provided comprising one ore more electrowetting displays according to any of the previous descriptions.

BRIEF DESCRIPTION OF THE DRAWINGS

The invention will further be described with reference to the enclosed drawings wherein embodiments of the invention are illustrated, and wherein:

FIGS. 2a-2d illustrate an electrowetting optical element, display and visual presentation assembly in accordance with the invention

DETAILED DESCRIPTION

Figure 1:
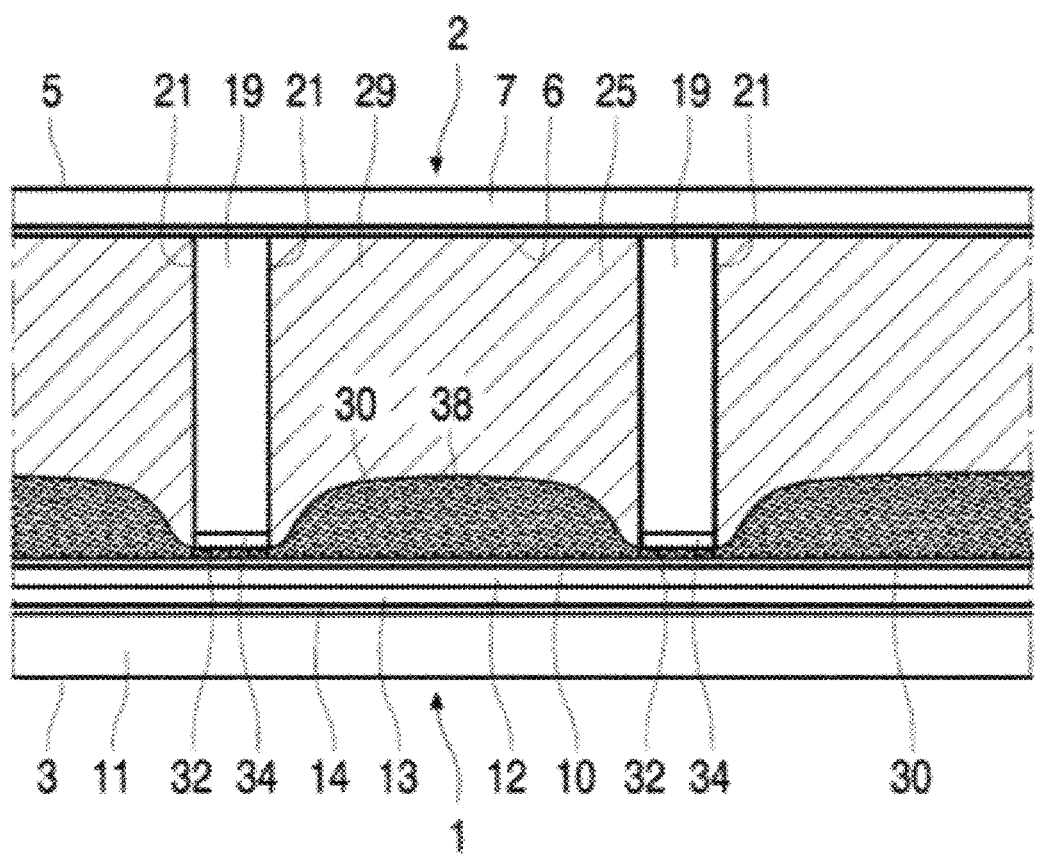
FIG. 1 illustrates an electrowetting optical element in accordance with the invention.

In FIG. 1, an electrowetting optical element or electrowetting element generally indicated with reference numeral 1, and situated between adjacent electrowetting elements, is illustrated. In FIG. 1 only one electrowetting optical element is shown. However, in a billboard multiple electrowetting optical elements are used to form the billboard. Preferably use is made of an optical wave guide panel to optically remove the visibility of the boundary of the element, i.e. the bezel of the individual electrowetting optical element.

In the electrowetting element 1, a containment space 25 is present between a second electrode layer stack 3 and a first electrode layer stack 5. The second electrode layer stack 3 comprises a substrate 11, an insulating layer 12, a second electrode layer 13 and an optional reflective layer 14 that will be described below. The second electrode layer stack 3 is formed of an electrically conducting material such as indium tin oxide (ITO) and has a hydrophobic interface surface 10 forming the interface with the containment space 25. The hydrophobic interface surface 10 can be formed by a layer of a suitable fluoropolymer, such as CYTOP™ or AF1600™.

The first electrode layer stack 5 comprises a superstrate 7 and a first electrode layer 6 supported by the superstrate 7. The first electrode layer 6 is in contact with the polar liquid 29, the first electrode layer 6 having a less hydrophobic or hydrophilic interface surface. The first electrode layer 6 is formed by a layer of transparent conductive material such as ITO or any other transparent conducting material. Also a conductive organic material known in the art have lower hydrophobic properties than the hydrophobic second interface surface 10 can be used. The first electrode layer 6 must contact the polar liquid 29 in the electrowetting element 1, but does not necessarily be a contiguous layer as shown in FIG. 1. It is sufficient if it covers at least a part of the containment space 25.

The first and second electrode layer 13, 6 together allow the electrowetting element 1 to be powered on and off by applying an appropriate voltage to them. The superstrate layer 7 and substrate layer 11 may be formed by any suitable material. These layers will often be formed by a transparent glass layer, and dependent on whether the electrowetting optical cell is of the transparent type or reflective type, the substrate layer 11 may be formed by a non-transparent layer as well. Alternatively, superstrate layer 7 and substrate layer 11 may be formed from a rigid or flexible polymer material such as polyethersulfone (PES), polyimide (PI), polythiophene (PT), phenol novolac (PN), or polycarbonate (PC).

The reflective layer 14 is in accordance with the invention a retroreflective layer and allows the electrowetting element to be used in a reflective manner having light incident on the superstrate side or the side of the first electrode layer stack 5 of the element 1 being reflected by the retroreflective layer 14 and exiting again through the first electrode layer stack 5 side. The retroreflective layer 14 can be made from a metal such as aluminium, deposited on the substrate 11 and formed as a retroreflector. In reflective type electrowetting elements, the retroreflective layer 14 may also act as second electrode layer.

In a transmissive or transparent electrowetting optical element, both the substrate and superstrate are transparent. In this embodiment, the retroreflective layer may be attached at the substrate of the second electrode layer stack 3, on the outside of the element, i.e. on the side opposite the containment space.

The electrically isolating layer 12 can be formed of for example silicon dioxide or aluminum oxide or any other suitable material which prevents a short circuit in applying the electrical voltage and allows an electrical field to build up such that the polar liquid is attracted to the second electrode layer 13, driving the non-polar liquid aside.

Preferably, the hydrophobic interface surface 10 exhibits a small contact angle hysteresis for improving the switchability of the optical cell, i.e. enabling smooth opening and closing of the cell upon switching in the powered up and powered off state.

Cell walls 19 are fixedly mounted on the less hydrophobic or hydrophilic surface of the first electrode layer 6. As a result of the mounting of the cell walls 19 on the first electrode layer, and due to the physical properties of the less hydrophobic surface, a strong mechanical connection between the cell walls 19 and the hydrophilic surface interface 6 is achieved. This results in a good structural integrity of the cell walls as mounted on the first electrode layer stack 5, contrary to conventional electrowetting optical elements wherein the cell walls 19 are attached second electrode layer stack 3. The setup shown in FIG. 1 is known as a reverse cell electrowetting optical element.

The cell walls 19, and the first and second electrode layer stacks 5 and 3 respectively, define the containment space 25 of the electrowetting optical cell 1. The containment space 25 is filled with a polar liquid 29 and a non-polar liquid 30. The polar liquid 29 and non-polar liquid 30 are immiscible with each other. In addition, the polar liquid 29 is formed of a substance having molecules with non-zero chemical polarity. The non-polar liquid is formed of a substance having molecules with negligible or very small chemical polarity. As a result, switching of the electrodes in the powered up and powered off state modifies the balance of forces between the non-polar liquid and the polar liquid and the hydrophobic surface, causing these liquids to rearrange suitably for opening and closing the electrowetting optical cell.

The cell walls 19 can be dimensioned such that they span the distance between the second electrode layer stack 5 and the first electrode layer stack 3. This way, the cell walls 19 prevent spreading of the polar liquid 30 to adjacent electrowetting cells. The cell walls 19 are optionally provided with hydrophobic surfaces 21 such that the non-polar liquid 30 will stay contiguous to the cell walls more easily than the polar-liquid, which is repelled by the hydrophobic surface of the cell walls 19.

The cell walls 19 comprise end faces 34 opposite the hydrophobic surface 10 of the second electrode layer 13. In FIG. 1 a small slit 32 is shown in between the end faces 34 and the hydrophobic surface layer 10 of the second electrode layer 12. This enables the non-polar liquid 30 to entrain the slits 32, and to form a small interface 24 on the other side of the slit near the edge of the cell walls 19 resulting from capillary action within the slit 32. An effect of the small capillary interface is that it greatly reduces the amount of light scattering caused by the cell walls 19 in the electrowetting optical cell 1.

A variety of retroreflective layers, sheets, films, strips or tapes can be used as retroreflective layer. Examples thereof are Type I, i.e. engineer grade retroreflector sheets made up of very small glass beads enclosed in a translucent pigmented substrate, for example in the substrate 11 of the second stack 3. This has the advantage of being very durable. Another example is a Type II, super engineer grade retroreflector sheet that is similar to Type I, except it uses larger glass beads, providing about twice the level of reflectivity of Type I sheeting. The cost is less than twice that of Type I and being more durable than Type I. Another example is Type III, Type III, also known as High Intensity. This sheeting is know as an "encapsulated lens" sheeting, made of 2 layers—an outer translucent pigmented layer, and an inner reflective layer faced with glass beads. The two layers are connected by a lattice, hence its distinctive 'honeycomb' appearance, where the lattice pattern varies. Cost is about twice that of Type I. Generally regarded to have a ten-year service life. Yet another example is Type IV. This is also a multi-layer sheeting, except that the reflective layer is made of microscopic cube-corner reflectors instead of glass beads—known as a "microprismatic" layer. This sheeting can be distinguished by the pattern of small "squares" superimposed upon a hexagonal lattice grid. This sheeting is about seven times as bright as Type I. Cost is comparable to type III. Generally regarded to have a ten-year service life. Yet another example is Type V: This sheeting is made of a metallized microprismatic material. Used in delineators and raised pavement markers. Cost is about 5½ times that of Type I. Generally regarded to have a five-year service life. Another example is Type VI: A vinyl backed microprismatic material. This sheeting differs from all other types by being composed of a flexible vinyl cloth, allowing it to be used for several applications. Cost is about 6 times that of Type I. Generally regarded to have a two-year service life. Yet another example is Type VII: This is also a microprismatic sheeting. This can be distinguished by the diamond-shaped lattice separating the sheeting layers, and a "coarse" grain to the microprisms. This sheeting is about fourteen times brighter than Type I at shallow viewing angles. Cost is about 5 times that of Type I. Generally regarded to have a ten-year service life. Even a further example is Type VIII: Also a microprismatic sheeting similar in design to Type VII and IX, but with distinguishing characteristics similar to Type IV. This sheeting is about six times brighter than Type I. Cost is about 5 times that of Type I. Generally regarded to have a ten-year service life. The next example is Type IX: A microprismatic sheeting very similar to Type VII, distinguished from Type VII by the "fine" grain of the microprisms. This sheeting is about six times brighter than Type I. Cost is about 5 times that of Type I. Generally regarded to have a ten-year service life. Final example is Type X: A microprismatic sheeting very similar to Types VII-IX, and has similar performance characteristics. Generally regarded to have a ten-year service life.

In FIGS. 2*a-d* the several units of the device are shown in several levels thereof. In FIG. 2*a* an electrowetting optical element 51 is shown in accordance with an example of the invention. The element or tile is comprised of several pixels 55, in this case 7×11 pixels that are divided from each other by the horizontal and vertical pixel wall illustrated by the dashed lines. These pixels together form the active area 54 of the element or tile 51 since these pixels can be activated/deactivated to transmit or block light and thus show a black or white colour in a black/white setup. Needless to say is that by applying for example RGB colour filters, a coloured display can be obtained.

In FIG. 2*b* an element or tile 52 is shown in which some of the pixels are activated and some are not, in such a way that the character "E" is displayed. The pixels that form part of the character, i.e. the back pixels, are known as the foreground 58 of the active area 54, and hence, the other pixels, the white pixels, are known as the background 57 of the active area 54.

As can be seen from FIG. 2*c*, an electrowetting display can be comprised of several elements or tiles, for example as in the example shown in FIG. 2*c*, 11 tiles 51*a*-51*k*. Each tile or element 51*a, b, c, d, . . . , k* can display one single character such that the display 61 of FIG. 2*c* a word or sentence with a maximum of 11 character can be display. The display also comprises an active area, formed by the total of the pixels of all elements 51*a-k*, and an inactive area or bezel 63 around these active areas for housing the elements and keeping them at place.

In FIG. 2*d* a visual presentation assembly 71 is shown having several displays such as the display of FIG. 2*c*. In this example 5 of there displays. The visual presentation assembly 71 however can also be constructed not from single displays with multiple elements but directly from a plurality of elements. The example shown in FIG. 2*d* comprises 5×11 tiles or elements in a layout of 5 rows of displays, 61*a-e*. The inactive area of the assembly 71 is present in between the elements and surrounding the elements as well as in between the rows of elements or hence in between the displays 61*a-e*.

In normal daylight conditions the pixels of the background, i.e. the pixels of the active area 74 that do not form part of the character being displayed, have a colour that does not differ that much from the colour of the inactive area's/the bezel 73.

A highly suitable application for the electrowetting visual presentation assembly's 71 is as billboards, dynamic road signs, etc. These are not only used for presenting or visualizing information during daytime but also during low light conditions in the evening or at night. In the example according to the invention wherein the elements are provided with passive reflective backgrounds provided by a layer of retroreflective material such as a retroreflective tape, the colour of the light reflected back by this retroreflective material during such light conditions is off-white. Accordingly, one can make a clear distinction between the background of the active area 74 and the inactive bezel areas. Hence, it is clear that the display area is made up of several individual elements bordered by bezels. By constructing the inactive areas 74 from a light transmissive material and providing them with retroreflective material as well, this effect is minimized. The effect of the difference in colour or mismatching in colour can be lowered even further by adding a grey filter over the retroreflective material or over the inactive area. Preferably, the full area of the visual presentation assembly 71 is provided at the backside thereof with retroreflective material such as retroreflective, and the more preferably, a grey filter then added over the inactive areas 73 to lower colour difference between the inactive area and the background of the active area even further. Alternatively, different retroreflective materials can be used to compensate for the colour difference by lowering/increasing the light intensity level of the retroreflective material or the light colour thereof, e.g. by a retroreflective material which reflects light mostly in the colour/light spectrum or wavelength corresponding to the background of the active area.

As will be appreciated by the person skilled in the art, the present invention may be practiced otherwise than as specifically described herein. Obvious modifications to the embodiments disclosed, and specific design choices, will be apparent to the skilled reader. The scope of the invention is only defined by the appended claims.

The invention claimed is:

1. An electrowetting display, wherein said electrowetting display comprises:
   an active display area; and
   a passive bezel for housing said active display area, wherein said passive bezel is manufactured from a material that allows transmission of light waves at least in the visible spectrum, and wherein said active display area comprises of one or more electrowetting optical elements, the one or more electrowetting optical elements comprising:
a first electrode layer stack and a second electrode layer stack, each of said first and second electrode layer stack comprising a voltage application electrode for rearranging polar liquid relative to non-polar liquid,
a containment space formed between said first and second electrode layer stack, and
one or more cell walls extending between said first and second electrode stacks for defining sides of said containment space forming cells, said containment space at least containing the polar liquid and the non-polar liquid, the polar and non-polar liquids being immiscible with each other, and
a retroreflective layer for reflecting incident light back through said element, and
wherein said passive bezel comprises a retroreflective layer for reflecting incident light back through said passive bezel.

2. The electrowetting display according to claim 1, wherein said retroreflective layer is attached to said first or second electrode layer stack.

3. The electrowetting display according to claim 1, wherein said retroreflective layer is comprised in said first or second electrode layer stack.

4. The electrowetting display according to claim 1, wherein
said first electrode layer stack comprises a superstrate and a first electrode layer having a hydrophilic interface surface with said containment space,
said second electrode layer stack comprises a substrate, a second electrode layer and an insulating layer having a hydrophobic interface surface with said containment space, and
said hydrophobic interface surface of said second electrode stack has a higher hydrophobicity than said hydrophobic interface surface of said first electrode stack.

5. The electrowetting display according to claim 4, wherein said retroreflective layer is comprised in said first electrode layer stack.

6. The electrowetting display according to claim 5, wherein said retroreflective layer is disposed between said superstrate and said first electrode layer.

7. The electrowetting display according to claim 4, wherein said retroreflective layer is comprised in said second electrode layer stack.

8. The electrowetting display according to claim 7, wherein said retroreflective layer is disposed between said substrate and said second electrode layer.

9. The electrowetting display according to claim 1, wherein said material of said passive bezel is coloured in accordance with a background colour of said one or more electrowetting optical elements of the active display area.

10. The electrowetting display according to claim 9, wherein said colouring of said passive bezel is provided by adding a grey filter on top of said retroreflective layer.

11. The electrowetting display according to claim 9, wherein said colouring of said passive bezel is provided by a retroreflective layer having a lower level of light reflection in the visible spectrum for reflecting grey light.

12. The electrowetting display according to claim 1, wherein said retroreflectivity of both said active display area and said passive bezel is provided by a single retroreflective layer.

13. The electrowetting display according to claim 1, wherein said retroreflectivity of said active display area and said passive bezel is provided by two separate retroreflective layers.

14. The electrowetting display according to claim 12, wherein said retroreflective layer comprises a retroreflective tape.

15. A visual presentation assembly comprising one or more electrowetting displays according to claim 14.

16. A visual presentation assembly comprising a plurality of electrowetting displays according to claim 1.

* * * * *